United States Patent
Masuko

(10) Patent No.: US 8,599,287 B2
(45) Date of Patent: Dec. 3, 2013

(54) IMAGE PROVIDING DEVICE, IMAGE PROCESSING METHOD, IMAGE PROCESSING PROGRAM, AND RECORDING MEDIUM FOR FORMING A MOSAIC IMAGE

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/884,353

(22) PCT Filed: Apr. 2, 2012

(86) PCT No.: PCT/JP2012/058826
§ 371 (c)(1),
(2), (4) Date: May 9, 2013

(87) PCT Pub. No.: WO2012/176523
PCT Pub. Date: Dec. 27, 2012

(65) Prior Publication Data
US 2013/0229548 A1 Sep. 5, 2013

(30) Foreign Application Priority Data
Jun. 24, 2011 (JP) .................................. 2011-140290

(51) Int. Cl.
*H04N 5/262* (2006.01)
*G06K 9/36* (2006.01)

(52) U.S. Cl.
USPC ............ 348/239; 348/252; 382/268; 382/284

(58) Field of Classification Search
None
See application file for complete search history.

(56) References Cited

U.S. PATENT DOCUMENTS

| | | | |
|---|---|---|---|
| 6,137,498 A * | 10/2000 | Silvers | 345/629 |
| 6,335,985 B1 * | 1/2002 | Sambonsugi et al. | 382/190 |
| 6,556,210 B1 | 4/2003 | Yamamoto et al. | |
| 6,927,874 B1 * | 8/2005 | Enokida et al. | 358/1.18 |
| 7,362,900 B2 * | 4/2008 | Urano et al. | 382/199 |
| 7,545,984 B1 * | 6/2009 | Kiel et al. | 382/220 |

(Continued)

FOREIGN PATENT DOCUMENTS

| | | |
|---|---|---|
| JP | 11-341266 A | 12/1999 |
| JP | 2000-295453 A | 10/2000 |

(Continued)

OTHER PUBLICATIONS

Kazuyo Kojima et al., "Decorative Photomosaics Respecting Human Visual Perception", Transactions of Information Processing Society of Japan, Jul. 15, 2008, pp. 2703-2711, vol. 49, No. 7.

(Continued)

*Primary Examiner* — Ngoc-Yen Vu
(74) *Attorney, Agent, or Firm* — Sughrue Mion, PLLC

(57) ABSTRACT

A mosaic image having high recognizability of a picture of an original image is provided while the number of division of the original image is suppressed. An image providing device includes a specifying means that specifies a region including an edge of an image from a plurality of regions, a dividing means that further divides the specified region into a plurality of regions, an acquisition means that acquires an image specified by a user, a determination means that determines a region to which the acquired image is assigned from regions not divided by the dividing means among the plurality of regions and from regions formed by being divided by the dividing means, and a presentation means that causes a mosaic image in which the acquired image is arranged on the basis of an assignment determined by the determination means to be presented.

3 Claims, 11 Drawing Sheets

(56) References Cited

U.S. PATENT DOCUMENTS

| | | | |
|---|---|---|---|
| 7,565,028 B2* | 7/2009 | Saed | 382/284 |
| 8,160,358 B2* | 4/2012 | Son et al. | 382/175 |
| 8,456,721 B2* | 6/2013 | Arimura et al. | 358/518 |
| 2004/0145592 A1* | 7/2004 | Twersky | 345/619 |
| 2007/0201749 A1* | 8/2007 | Yamauchi et al. | 382/225 |
| 2011/0050723 A1 | 3/2011 | Tokunaga et al. | |
| 2012/0250986 A1* | 10/2012 | Masuko | 382/164 |
| 2013/0156316 A1* | 6/2013 | Masuko | 382/173 |

FOREIGN PATENT DOCUMENTS

| | | |
|---|---|---|
| JP | 2001-238067 A | 8/2001 |
| JP | 2010-4166 A | 1/2010 |
| JP | 2011-078078 A | 4/2011 |

OTHER PUBLICATIONS

Keita Funabashi et al., "Real-time photo mosaic for database generation of edge feature", Eizo Media Shori Symposium Dai 14 Kai Symposium Shiryo, Oct. 7, 2009, pp. 89-90.

Shinichi Doi et al., "P2P Network Photo Paint Tool", Symposium on Multimedia, Distributed, Cooperative and Mobile Systems (DICOMO2009) Ronbunshu, Jul. 8, 2009, pp. 1855-1862, vol. 2009, No. 1.

International Search Report of PCT/JP2012/058826 dated Jun. 26, 2012.

* cited by examiner

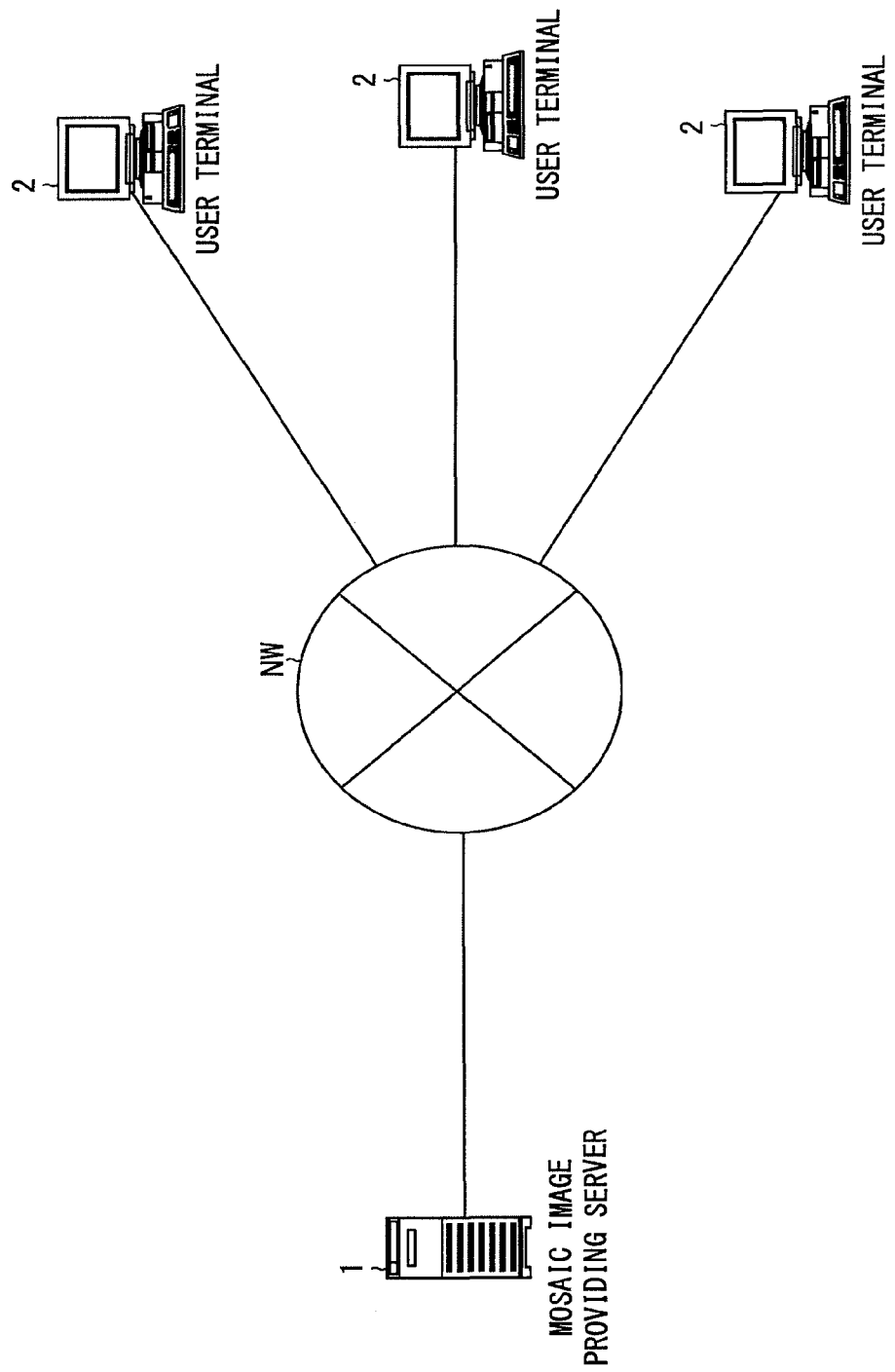

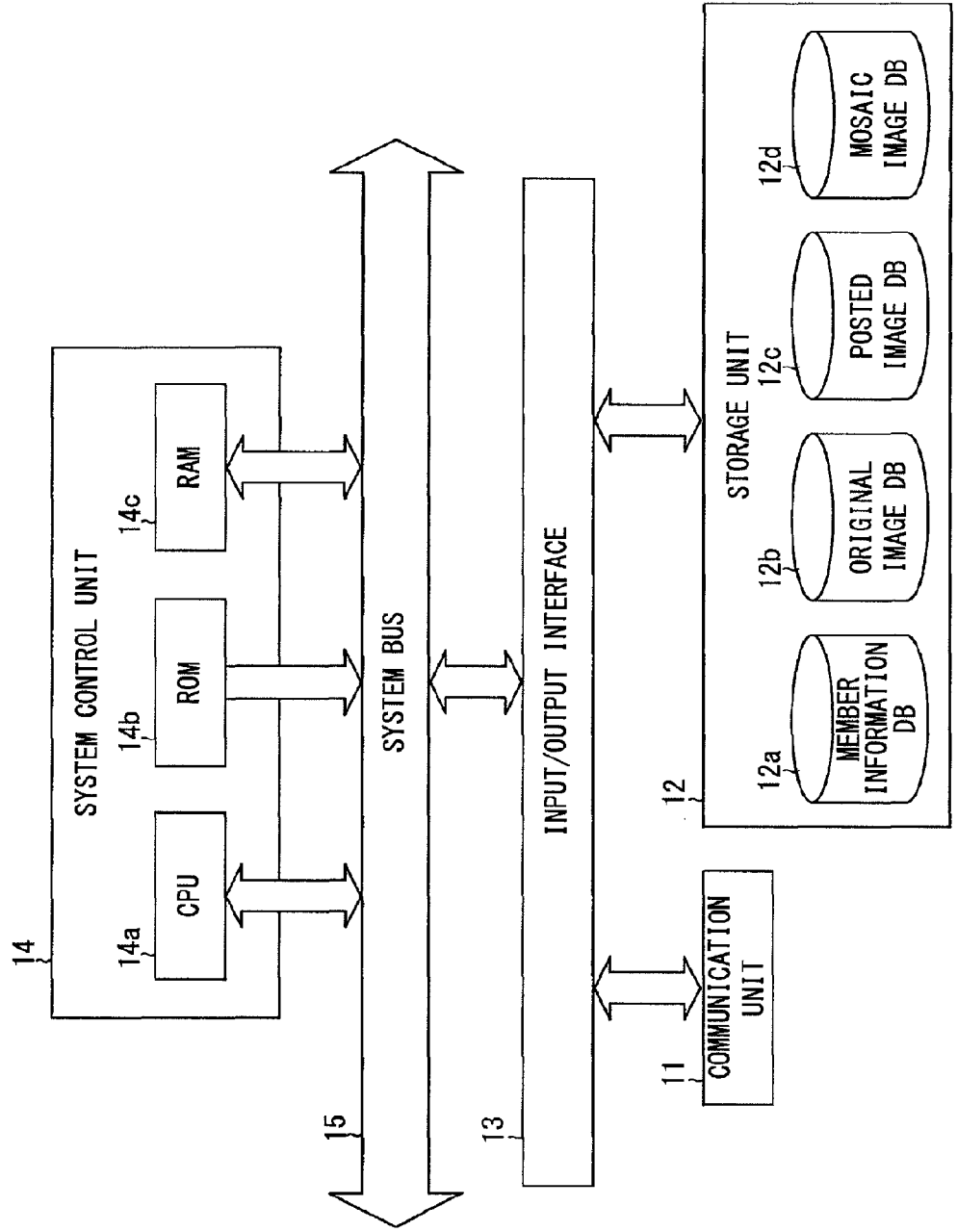

FIG.5A
MEMBER INFORMATION DB 12a

| USER ID |
|---|
| PASSWORD |
| NICKNAME |
| NAME |
| DATE OF BIRTH |
| GENDER |
| ADDRESS |
| PHONE NUMBER |
| EMAIL ADDRESS |
| . . . |

FIG.5B
ORIGINAL IMAGE DB 12b

| ORIGINAL IMAGE ID |
|---|
| ORIGINAL IMAGE DATA |
| BASIC DIVISION NUMBER INFORMATION |
| BASIC REGION INFORMATION (0, 0) |
| BASIC REGION INFORMATION (0, 1) |
| BASIC REGION INFORMATION (0, 2) |
| . . . |

FIG.5C
BASIC REGION INFORMATION (X1, Y1)

| EDGE DEGREE |
|---|
| CHILD DIVISION NUMBER INFORMATION |
| REPRESENTATIVE COLOR VALUE (X1, Y1) (0, 0) |
| REPRESENTATIVE COLOR VALUE (X1, Y1) (0, 1) |
| REPRESENTATIVE COLOR VALUE (X1, Y1) (0, 2) |
| . . . |

FIG.5D
POSTED IMAGE DB 12c

| MOSAIC IMAGE ID |
|---|
| NUMBER OF POSTED IMAGES |
| POSTED IMAGE INFORMATION 1 |
| POSTED IMAGE INFORMATION 2 |
| POSTED IMAGE INFORMATION 3 |
| . . . |

FIG.5E
POSTED IMAGE INFORMATION

| IMAGE NUMBER |
|---|
| USER ID |
| POSTED IMAGE DATA |
| REPRESENTATIVE COLOR VALUE |

FIG.5F
MOSAIC IMAGE DB 12d

| MOSAIC IMAGE ID |
|---|
| ORIGINAL IMAGE ID |
| ASSIGNMENT IMAGE INFORMATION (0, 0) |
| ASSIGNMENT IMAGE INFORMATION (0, 1) |
| ASSIGNMENT IMAGE INFORMATION (0, 2) |
| . . . |
| MOSAIC IMAGE DISPLAY DATA |

FIG.5G
ASSIGNED IMAGE INFORMATION (X1, Y1)

| ASSIGNED IMAGE NUMBER (X1, Y1) (0, 0) |
|---|
| ASSIGNED IMAGE NUMBER (X1, Y1) (0, 1) |
| ASSIGNED IMAGE NUMBER (X1, Y1) (0, 2) |
| . . . |

FIG.6

|    | 0  | 1  | 2 | 3  | 4  | 5  | 6  | 7  | 8 |
|----|----|----|---|----|----|----|----|----|---|
| 0  | 0  | 0  | 0 | 0  | 3  | 0  | 0  | 0  | 0 |
| 1  | 0  | 0  | 0 | 1  | 7  | 2  | 0  | 0  | 0 |
| 2  | 0  | 0  | 0 | 5  | 8  | 0  | 0  | 7  | 3 |
| 3  | 0  | 0  | 6 | 6  | 20 | 8  | 6  | 7  | 5 |
| 4  | 0  | 13 | 0 | 10 | 10 | 12 | 14 | 13 | 9 |
| 5  | 14 | 20 | 0 | 0  | 9  | 0  | 6  | 0  | 1 |
| 6  | 28 | 6  | 6 | 8  | 13 | 0  | 6  | 0  | 0 |
| 7  | 35 | 6  | 3 | 0  | 7  | 13 | 8  | 0  | 0 |
| 8  | 0  | 10 | 0 | 0  | 6  | 6  | 8  | 0  | 0 |
| 9  | 0  | 9  | 0 | 0  | 7  | 0  | 4  | 6  | 0 |
| 10 | 0  | 0  | 0 | 0  | 4  | 1  | 0  | 11 | 0 |

FIG.7A
DIVISION PATTERN TABLE

| NUMBER OF DIVISION PATTERNS |
| --- |
| DIVISION PATTERN INFORMATION 1 |
| DIVISION PATTERN INFORMATION 2 |
| DIVISION PATTERN INFORMATION 3 |
| . . . |

FIG.7B
DIVISION PATTERN INFORMATION

| CHILD DIVISION NUMBER INFORMATION |
| --- |
| MINIMUM EDGE DEGREE | und
IMAGE PROVIDING DEVICE, IMAGE PROCESSING METHOD, IMAGE PROCESSING PROGRAM, AND RECORDING MEDIUM FOR FORMING A MOSAIC IMAGE

CROSS REFERENCE TO RELATED APPLICATIONS

This is a National Stage of International Application No. PCT/JP2012/058826 filed Apr. 2, 2012, claiming priority based on Japanese Patent Application Nos. 2011-140290 filed Jun. 24, 2011, the contents of all of which are incorporated herein by reference in their entirety.

TECHNICAL FIELD

The present invention relates to a technical field of an image providing device and an image processing method for causing a mosaic image formed by combining images acquired from a terminal device to be presented.

BACKGROUND ART

Conventionally, as a representation method of an image in, for example, a poster and a Web page used for an advertisement, a notice of an event, and the like, a method is known in which a plurality of images to be combined (hereinafter referred to as "material images") are arranged like tiles and the images are represented as a mosaic image (for example, a mosaic art and a photo mosaic). In this representation method, for example, an image (hereinafter referred to as an "original image") to be an original of a picture of the mosaic image is divided into a plurality of regions. Each material image is assigned to, for example, a region whose color tone, pattern or the like is similar to those of the material image. Thereby, a mosaic image which represents a picture of the original image is generated.

On the other hand, a technique is known in which a server device acquires images, which are provided from a user as material images, from a terminal device through a network and causes the terminal device to display a mosaic image generated by using the acquired images. In this case, what images are the material images depends on a determination of the user who provides the images. Therefore, when such images are used as the material images, a problem to be solved is how to generate a mosaic image which has high recognizability of a picture of the original image.

For example, Patent Literature 1 discloses a technique, the object of which is to provide a mosaic image that has high recognizability. Specifically, when a mosaic image providing device determines a block, in which a material image posted by a user is placed, from a plurality of blocks obtained by dividing a target image which is an original of the mosaic image, the mosaic image providing device determines a block selected by the user to be a block in which the material image is placed or automatically determines a block in which the material image is placed without being limited by an image of the block. Further, the mosaic image providing device corrects color of a material image so that an average density value of a basic color of the material image is an average density value of the basic color of a block in which the material image is placed. Furthermore, until when the number of material images posted by the user reaches a number necessary to complete the mosaic image, a mosaic image in which the material images are placed in only a part of the blocks is displayed on the terminal device. In other words, a mosaic image in an uncompleted state is displayed.

CITATION LIST

Patent Literature

Patent Literature 1: JP 2010-4166 A

SUMMARY OF INVENTION

Technical Problem

However, just matching the color of the material image to the color of the block may not improve the recognizability of the picture of the original image. Specifically, when a total number of blocks to complete the mosaic image is small, a ratio of the area of one block to the original image is large. Therefore, the resolution of the mosaic image is low and the mosaic image is a coarse image. This is the reason of the above problem. On the other hand, when reducing the area of one block, the total number of blocks to complete the mosaic image is large, so that a large number of material images are required to complete the mosaic image.

The present invention is made in view of the above situation, and an object of the present invention is to provide an image providing device, an image processing method, an image processing program, and a recording medium which can provide a mosaic image having high recognizability of the picture of the original image while suppressing the number of regions required to complete the mosaic image.

Solution to Problem

In order to achieve the above object, an invention described in claim 1 is an image providing device for providing a mosaic image of an original image divided into a plurality of regions, the image providing device comprising: a specifying means that specifies a region including an edge of an image from the plurality of regions; a dividing means that further divides the specified region into a plurality of regions; an acquisition means that acquires an image specified by a user; a determination means that determines a region to which the acquired image is assigned from regions not divided by the dividing means among the plurality of regions and from the regions formed by being divided by the dividing means; and a presentation means that, on the basis of assignment determined by the determination means, causes a mosaic image in which the acquired image is arranged to be presented.

According to this invention, among a plurality of regions, a region including an edge, which contributes to improve the recognizability of the picture of the original image, is divided into smaller regions, so that it is possible to provide a mosaic image having high recognizability of the picture of the original image while suppressing the number of regions required to complete the mosaic image.

An invention described in claim 2 is the image providing device according to claim 1, wherein the specifying means calculates an edge degree indicating a degree of an edge included in an image of the region and specifies the region whose edge degree is greater than or equal to a predetermined value to be a region including an edge.

According to this invention, it is possible to determine a region that includes an edge by the predetermined value.

An invention described in claim 3 is the image providing device according to claim 2, wherein the dividing means divides the specified region so that the higher the calculated edge degree of the region, the greater the number of division.

According to this invention, the number of division of a region including an edge varies depending on the degree of influence on the recognizability of the picture of the original image, so that it is possible to provide a mosaic image having higher recognizability of the picture of the original image while suppressing the number of division of the original image.

An invention described in claim 4 is an image providing method in an image providing device for providing a mosaic image of an original image divided into a plurality of regions, the image providing method comprising: a specifying step of specifying a region including an edge of an image from the plurality of regions; a dividing step of further dividing the specified region into a plurality of regions; an acquisition step of acquiring an image specified by a user; a determination step of determining a region to which the acquired image is assigned from regions not divided in the dividing step among the plurality of regions and from the regions formed by being divided in the dividing step; and a presentation step of, on the basis of assignment determined in the determination step, causing a mosaic image in which the acquired image is arranged to be presented.

An invention described in claim 5 is an image processing program that causes a computer included in an image providing device for providing a mosaic image of an original image divided into a plurality of regions to function as: a specifying means that specifies a region including an edge of an image from the plurality of regions; a dividing means that further divides the specified region into a plurality of regions; an acquisition means that acquires an image specified by a user; a determination means that determines a region to which the acquired image is assigned from regions not divided by the dividing means among the plurality of regions and from the regions formed by being divided by the dividing means; and a presentation means that, on the basis of assignment determined by the determination means, causes a mosaic image in which the acquired image is arranged to be presented.

An invention described in claim 6 is a recording medium in which an image processing program is computer-readably recorded, the image processing program causing a computer, which is included in an image providing device for providing a mosaic image of an original image divided into a plurality of regions, to function as: a specifying means that specifies a region including an edge of an image from the plurality of regions; a dividing means that further divides the specified region into a plurality of regions; an acquisition means that acquires an image specified by a user; a determination means that determines a region to which the acquired image is assigned from regions not divided by the dividing means among the plurality of regions and from the regions formed by being divided by the dividing means; and a presentation means that, on the basis of assignment determined by the determination means, causes a mosaic image in which the acquired image is arranged to be presented.

Advantageous Effects of Invention

According to the invention, among a plurality of regions, a region including an edge, which contributes to improve the recognizability of the picture of the original image, is divided into smaller regions, so that it is possible to provide a mosaic image having high recognizability of the picture of the original image while suppressing the number of regions required to complete the mosaic image.

BRIEF DESCRIPTION OF DRAWINGS

FIG. 1 is a diagram showing an example of a schematic configuration of a mosaic image providing system S according to an embodiment.

FIG. 4 is a block diagram showing an example of a schematic configuration of a mosaic image providing server 1 according to the embodiment.

FIG. 5A is a diagram showing an example of content registered in a member information DB 12a according to the embodiment. FIG. 5B is a diagram showing an example of content registered in an original image DB 12b. FIG. 5C is a diagram showing an example of content included in basic region information. FIG. 5D is a diagram showing an example of content registered in a posted image DB 12c. FIG. 5E is a diagram showing an example of content included in posted image information. FIG. 5F is a diagram showing an example of content registered in a mosaic image DB 12d. FIG. 5G is a diagram showing an example of content included in assigned image information.

FIG. 6 is a diagram showing an example of an edge degree of each basic region 200 shown in FIG. 2A.

FIG. 7A is a diagram showing an example of content included in a division pattern table and FIG. 7B is a diagram showing an example of content included in division pattern information.

DESCRIPTION OF EMBODIMENT

Hereinafter, an embodiment of the present invention will be described in detail with reference to the drawings. The embodiment described below is an embodiment where the present invention is applied to a mosaic image providing system.

1. Schematic Configuration and Function of Mosaic Image Providing System

First, configuration and function of a mosaic image providing system S according to the embodiment will be described with reference to FIGS. 1 to 3. FIG. 1 is a diagram showing an example of a schematic configuration of the mosaic image providing system S according to the embodiment.

As shown in FIG. 1, the mosaic image providing system S is configured to include a mosaic image providing server 1 and a plurality of user terminals 2. The mosaic image providing server 1 and each user terminal 2 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and gateways.

The mosaic image providing server 1 (an example of an image providing device of the present invention) is a Web server that transmits a Web page in which a mosaic image is displayed to a user terminal 2. The mosaic image is formed by arranging (combining) a plurality of images to be materials in a pattern like tiles. The mosaic image providing server 1 acquires images from each user terminal 2 through the network NW in order to collect images to be materials. The image acquired from the user terminal 2 is an image posted by a user (hereinafter referred to as a "posted image").

The user terminal 2 is a terminal device of a user who uses the mosaic image providing system S. The user terminal 2 accesses the mosaic image providing server 1 on the basis of an operation from a user. Thereby, the user terminal 2 receives a Web page from the mosaic image providing server 1 and displays the Web page. The user posts an image to be a material of a mosaic image and causes the mosaic image to be displayed through a Web page displayed on a screen of the user terminal 2. In the user terminal 2, software such as a browser and an email client is installed. For example, a personal computer, a PDA (Personal Digital Assistant), a mobile information terminal such as a smartphone, and a mobile phone are used as the user terminal 2.

In the mosaic image providing system S having such a configuration, for example, an image to be an origin of a picture of the mosaic image is prepared in advance. This image is an original image. The mosaic image providing server 1 arranges posted images so that the picture represented by the mosaic image is similar to the picture represented by the original image.

Figure 2A:
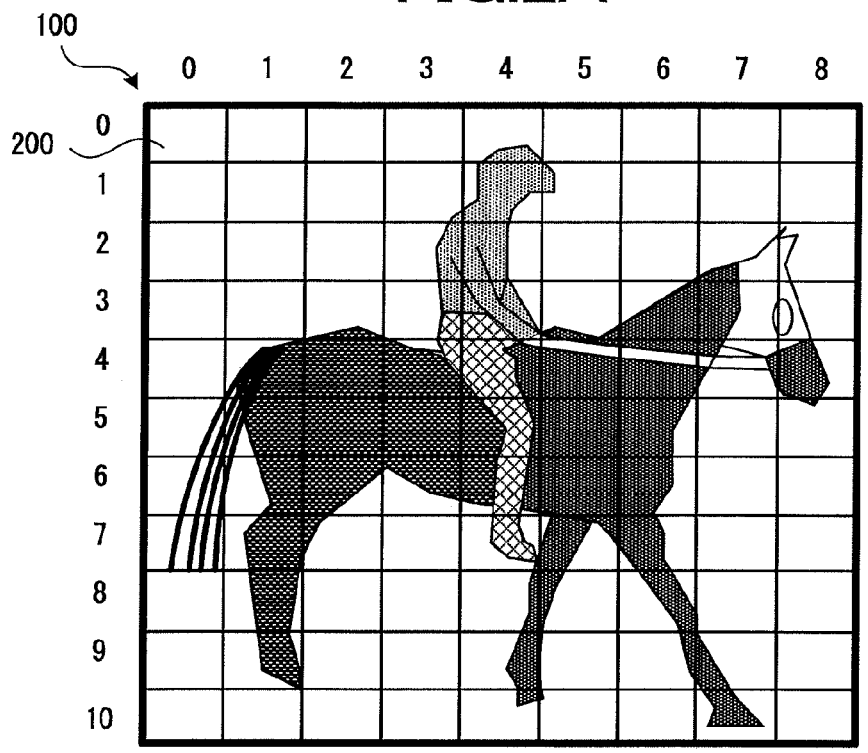
FIG. 2A is a diagram showing an example of an original image 100 divided into basic regions and FIG. 2B is a diagram showing an example of an original image 100 in which basic regions including an edge are divided into child regions.
Figure 2B:
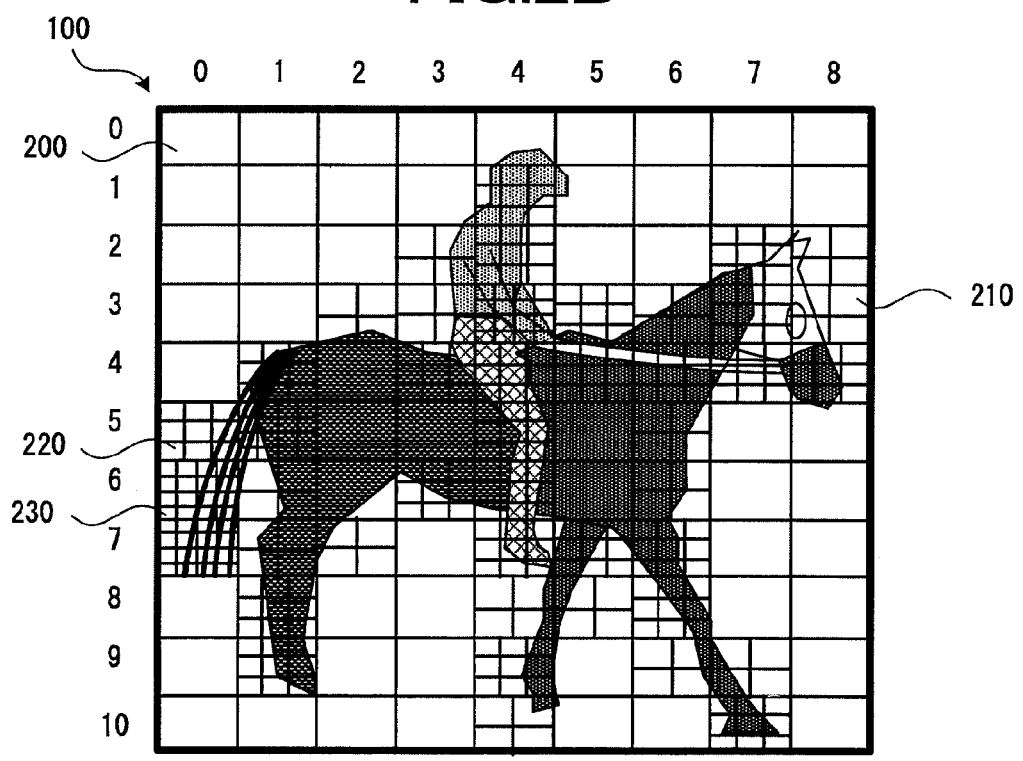

FIGS. 2A and 2B are diagrams showing an example of the original image and a division example of the original image. An image 100 shown in FIGS. 2A and 2B is an image representing a picture of a walking horse and a horseman riding the horse. Here, it is assumed that the color of the horse is dark brown. Also it is assumed that the color of the trousers of the horseman is yellow and the color of the jacket of the horseman is light blue. Further, it is assumed that the color of the background is white. It is assumed that each portion is not filled with a uniform color but there is some color variation depending on positions. Here, it is assumed that the color of the horse is dark brown. Also it is assumed that the color of the trousers of the horseman is yellow and the color of the jacket of the horseman is light blue. Further, it is assumed that the color of the background is white. It is assumed that each portion is not filled with a uniform color but there is some color variation depending on positions.

The original image is divided into a plurality of regions (hereinafter referred to as "divide regions"). A posted image acquired from the user terminal 2 is assigned to each divided region. First, the mosaic image providing server 1 divides the original image into a predetermined number of divided regions. The divided regions formed when the original image is first divided are referred to as "basic regions". For example, as shown in FIG. 2A, the image 100 is divided into 9 regions in the horizontal direction and 11 regions in the vertical direction to be a total of 99 divided regions 200 which are the basic regions. The number of the divided regions is referred to as the "number of division". A total number of the basic regions is referred to as the "number of basic division".

Figure 3A:
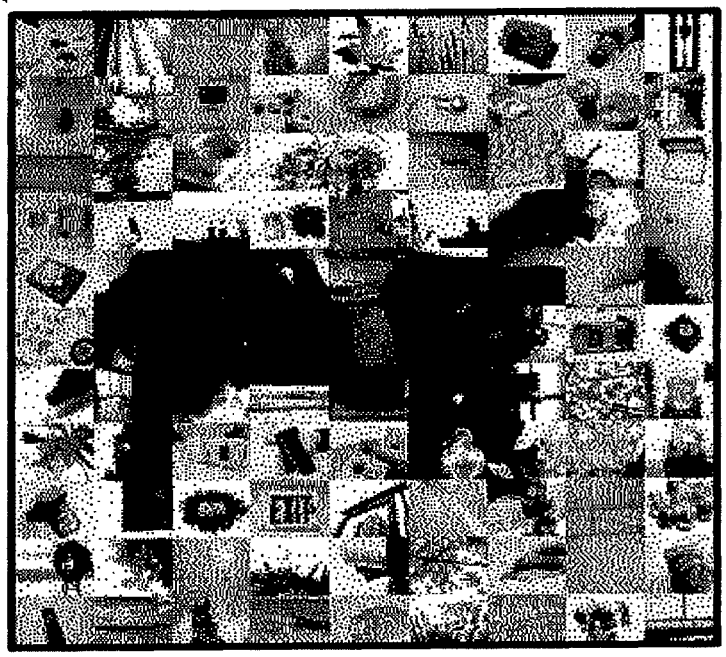
FIG. 3A is a diagram showing a display example of a completed mosaic image 300a when assuming that posted images are assigned to only the basic regions and FIG. 3B is a diagram showing a display example of a completed mosaic image 300b when posted images are assigned to child regions.

FIG. 3A is a diagram showing a display example of a completed mosaic image 300a when it is assumed that posted images are assigned to only the basic regions. The completed mosaic image is a mosaic image in which posted images are assigned to all the divided regions. In a state in which the original image is divided by the number of basic division, a ratio of the display area of each divided region 200 to the display area of the original image is relatively large. Therefore, if a mosaic image is generated in this state, as shown in FIG. 3A, a mosaic image with a relatively low resolution is generated. Therefore, the recognizability of the picture of the original image is not high.

Therefore, the mosaic image providing server 1 further divides basic regions including an edge of the image into a plurality of divided regions (hereinafter referred to as "child regions") in order to improve the recognizability of the picture of the original image. The edge is a portion in which, for example, the brightness, the color phase, and the chroma saturation of the image change rapidly (sharply). The basic region including an edge is, for example, a contour portion, a characteristic portion, a portion of a complex pattern, or the like of the picture of the original image. Such a basic region is divided into a plurality of child regions, so that the display area of one child region is small.

To specify the basic areas including an edge, the mosaic image providing server 1 calculates an edge degree of each basic region as an index representing the degree of the edge. The higher the degree of the change of the brightness and the like in an image included in the basic region, that is, the stronger the edge, the higher the edge degree of the basic region. The more the amount of edge included in the divided region, the higher the edge degree of the basic region. The mosaic image providing server 1 determines a basic region whose edge degree is greater than or equal to a predetermined threshold value to be the basic region including an edge.

The higher the edge degree of the basic region, the greater the number of division set by the mosaic image providing server 1. In other words, the mosaic image providing server 1 divides the basic region into a greater number of child regions. Therefore, the higher the edge degree of the basic region, the smaller the child regions the basic region is divided into. The number of division at this time is referred to as the "number of child division".

For example, as shown in FIG. 2B, the divided region 200 including an edge is divided into child regions of a total of four divided regions 210 including two regions in the horizontal direction and two regions in the vertical direction, child regions of a total of nine divided regions 220 including three regions in the horizontal direction and three regions in the vertical direction, or child regions of a total of 16 divided regions 230 including four regions in the horizontal direction and four regions in the vertical direction according to the edge degree. Regarding a basic region which is not divided into child regions, the mosaic image providing server 1 assigns a posted image to the basic region. On the other hand, regarding a basic region which is divided into child regions, the mosaic image providing server 1 assigns posted images to the child regions created (generated) by dividing the basic region.

Figure 3B:
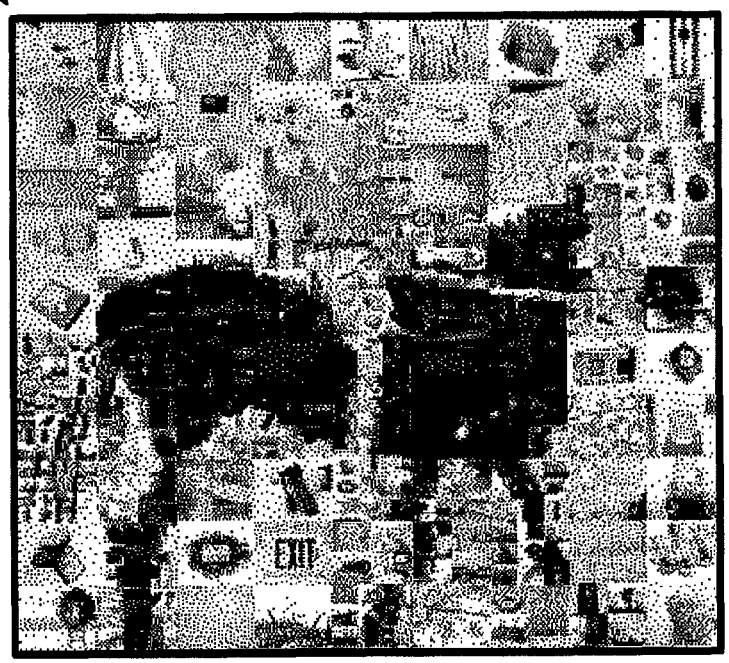

FIG. 3B is a diagram showing a display example of a completed mosaic image 300b. FIG. 3B is a mosaic image generated by assigning posted images to each divided region shown in FIG. 2B. As shown in FIG. 3B, the display area of one divided region in an edge portion is smaller than the display area of one divided region in a portion including no edge. Therefore, the resolution of the edge portion is high, so that the recognizability of the edge can be improved. The recognizability of the edge is improved, so that the recognizability of the picture of the original image can be improved. The higher the edge degree in a portion, the smaller the display area of one divided region in the portion, so that the recognizability of the picture of the original image can be more improved.

By the way, in the example shown in FIG. 2B, there are 17 divided regions 200 each of which is divided into four divided regions 210. There are 24 divided regions 200 each of which is divided into nine divided regions 220. There are four divided regions 200 each of which is divided into 16 divided regions 230. Therefore, a total number of the divided regions is 402. For example, if the number of basic division is set to four times the number of basic division of the example of FIG. 2A in order to improve the recognizability of the picture of the original image, a total number of the divided regions is 496. Then, the total number of the divided regions is greater than that in the case of the example of FIG. 2B. In other words, in the embodiment, a total number of divided regions can be smaller than that in the case in which the original image is divided so that the area of all the divided regions is small from the beginning. In this way, the mosaic image providing server 1 does not divide the basic region which does not affect so much the recognizability of the picture of the original image or divides such a basic region into a smaller number of child regions. Thereby, it is possible to suppress the number of posted images required to complete the mosaic image because the total number of divided regions is suppressed and it is also possible to improve the recognizability of the picture of the original image.

2. Configuration of Mosaic Image Providing Server

Next, a configuration of the mosaic image providing server 1 will be described with reference to FIGS. 4 to 7.

FIG. 4 is a block diagram showing an example of a schematic configuration of the mosaic image providing server 1 according to the embodiment. As shown in FIG. 4, the mosaic image providing server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the user terminals 2 and the like.

The storage unit 12 includes, for example, a hard disk drive and the like. In the storage unit 12, a member information DB (database) 12a, an original image DB 12b, a posted image DB 12c, a mosaic image DB 12d, and the like are constructed.

FIG. 5A is a diagram showing an example of content registered in the member information DB 12a according to the embodiment. In the member information DB 12a, member information related to users registered as a member in the mosaic image providing system S is registered. Specifically, in the member information DB 12a, a user ID which is identification information of the user, a password, a nickname, a name, a date of birth, a gender, an address, a phone number, an email address, and the like are registered in association with each user.

FIG. 5B is a diagram showing an example of content registered in the original image DB 12b according to the embodiment. In the original image DB 12b, original images and information related to the original images are registered. Specifically, in the original image DB 12b, an original image ID which is identification information of the original image, original image data, basic division number information, a plurality of pieces of basic region information are registered in association with each original image.

The original image ID is identification information of an original image. The original image data is image data of an original image. Examples of a format of the image data used in the mosaic image providing system S include JPEG (Joint Photographic Experts Group), TIFF (Tagged-Image File Format), and PNG (Portable Network Graphics).

The basic division number information is information indicating the number of basic division. Specifically, the basic division number information includes the number of basic division, the number of basic horizontal division, and the number of basic vertical division. The number of basic horizontal division is the number of divided regions in the horizontal direction. Specifically, the number of basic horizontal division is the number of basic regions of the original image arranged in the horizontal direction. The number of basic vertical division is the number of divided regions in the vertical direction. Specifically, the number of basic vertical division is the number of basic regions of the original image arranged in the vertical direction. The number of basic division is obtained by multiplying the number of basic horizontal division by the number of basic vertical division.

The basic region information is information related to a basic region. The number of pieces of basic region information to be registered is equal to the number of basic division. Each basic region information is registered in association with an index of a corresponding basic region. An index having a form of (X1, Y1) is assigned to each basic region. Here, X1 indicates a position of the basic region in the horizontal direction. Y1 indicates a position of the basic region in the vertical direction. The index of the basic region located at the upper left corner of the original image is (0, 0). The basic region (X1, Y1) is a basic region located at the (Y1+1) th position from the uppermost position among the basic regions located at the (X1+1) th position from the leftmost position.

Dividing the original image into a plurality of regions is dividing a region corresponding to the entire original image into a plurality of regions, that is, making it possible to specify in what region each pixel in the original image is included (or what pixels each region includes). The system control unit 14 can specify a region in which each pixel is included by acquiring the numbers of pixels in the original image in the vertical and horizontal directions and the numbers of horizontal division and vertical division of the original image. Therefore, dividing the original image into a plurality of regions does not necessarily mean dividing the image data of the original image into image data of each region. Therefore, the system control unit 14 may register image data of each region into the original image DB 12b or need not register image data of each region into the original image DB 12b.

FIG. 5C is a diagram showing an example of content included in the basic region information. As shown in FIG. 5C, in the basic region information, the edge degree, child division number information, and one or more representative color values are included.

The edge degree is used to determine whether or not to divide the basic region and to determine the number of child regions when dividing the basic region. The edge degree is calculated by the system control unit 14. First, the system control unit 14 calculates a pixel edge degree of each pixel included in the basic region. The pixel edge degree indicates the strength of the edge of the pixel itself. Specifically, the system control unit 14 calculates a difference between the value of a pixel of interest (a pixel whose pixel edge degree will be calculated) and the value of each pixel adjacent to the pixel of interest. For example, the value of the pixel is present for each basic color (primary color) of R (red), G (green), and B (blue). For example, each pixel value of R, G, and B can be any value from 0 to 255. The system control unit 14 performs the above calculation for each basic color. The pixels adjacent to the pixel of interest are eight pixels located on the left, right, top, and bottom and in the diagonal directions of the pixel of interest. The system control unit 14 calculates the pixel edge degree by summing up the differences calculated for each basic color and further summing up the differences calculated for the eight pixels. These processes are represented by the following formula 1.

$$EP(x, y) = \sum_{i=-1}^{1} \sum_{j=-1}^{1} (|R(x, y) - R(x+i, y+1)| + |G(x, y) - G(x+i, y+i)| + |B(x, y) - B(x+i, y+i)|)$$ [Formula 1]

In the formula 1, x is the X coordinate of the pixel of interest based on the pixel located at the upper left corner of a region of interest (a basic region where the edge degree is calculated) and y is the Y coordinate of the pixel of interest based on the pixel located at the upper left corner of the region of interest. R(x, y), G(x, y), and B(x, y) are the pixel value of R, the pixel value of G, and the pixel value of B of a pixel located at the coordinates (x, y). EP(x, y) is the pixel edge degree of the pixel located at the coordinates (x, y). The pixel value may be represented by, for example, the CMYK color space, the Lab color space, and the like. The system control unit 14 may calculate squares of the difference calculated for each basic color and sum up the calculation results instead of summing up absolute values of the differences calculated for each basic color.

Next, the system control unit 14 sums up the pixel edge degrees of all the pixels in the basic region to calculate the edge degree of the basic region. This process is represented by the following formula 2.

$$EB(X1, Y1) = \sum_{i=0}^{w-1} \sum_{j=0}^{l-1} EP(i, j)$$ [Formula 2]

In the formula 2, EB(X1, Y1) is the edge degree of the basic region (X1, Y1). Further, w is the number of horizontal pixels of the basic region and l is the number of vertical pixels of the basic region. The method for calculating the edge degree is not limited to the method described above. For example, when calculating the pixel edge degree, the system control unit 14 may calculate the difference between the pixel values for only four pixels located on the left, right, top, and bottom of the pixel of interest. Further, instead of calculating the difference between the pixel values for each basic color, the system control unit 14 may calculate the pixel edge degree by, for example, calculating distances between the color of the pixel of interest and the colors of pixels adjacent to the pixel of interest and summing up the distances of color.

FIG. 6 is a diagram showing an example of the edge degree of each basic region 200 shown in FIG. 2A. FIG. 6 shows normalized edge degrees for easy understanding of the differences of the edge degrees of each basic region. As shown in FIG. 6, the edge degree of the basic regions that include no edge at all is 0. On the other hand, the edge degrees of the basic regions that include a contour of the horse or a contour of the horseman increase according to the length of the contour. In particular, the edge degree of the contour portion of the horse where the brightness difference from the background is large is high. Also, the edge degree is high in the tail portion of the horse (for example, basic regions (0, 6) and (0, 7)) which includes many lines and an arm portion of the horseman (for example, basic region (4, 3)) which has a complex pattern.

The child division number information is information indicating the number of child division of the basic region (X1, Y1). Specifically, the child division number information includes the number of child division, the number of child horizontal division, and the number of child vertical division. The number of child horizontal division is the number of division in the horizontal direction. Specifically, the number of child horizontal division is the number of child regions in a basic region arranged in the horizontal direction. The number of child vertical division is the number of division in the vertical direction. Specifically, the number of child vertical division is the number of child regions in a basic region arranged in the vertical direction. The number of child division is obtained by multiplying the number of child horizontal division by the number of child vertical division. When the basic region is not divided into child regions, for convenience, all of the number of child division, the number of child horizontal division, and the number of child vertical division in the child division number information are set to 1.

The representative color value is a value indicating a color that represents the divided region (hereinafter referred to as a "representative color"). For example, the representative color may be a color obtained by averaging colors in the entire divided region or may be a color occupying the largest area in the divided region. The representative color value includes, for example, values for each basic color of R, G, and B. The system control unit 14 determines a candidate of a divided region to which a posted image is assigned by comparing the representative color values of divided regions and the representative color value of the posted image. The representative color value may be represented by, for example, the CMYK color space, the Lab color space, and the like.

The number of representative color values to be registered is equal to the number of child division included in the child division number information. Each representative color value is registered in association with indexes of corresponding basic region and child region. An index having a form of (X1, Y1) (X2, Y2) is assigned to each child region. Here, X1 and Y1 are an index of the basic region in which the child region is included. X2 indicates a position of the child region in the horizontal direction in the basic region (X1, Y1). Y2 indicates a position of the child region in the vertical direction in the basic region (X1, Y1). An index of the child region located at the upper left corner of the basic region (X1, Y1) is (X1, Y1) (0, 0). The child region (X1, Y1) (X2, Y2) is a child region located at the (Y2+1)th position from the uppermost position among the child regions located at the (X2+1)th position from the leftmost position in the basic region (X1, Y1).

When the number of child division included in the child division number information is 1, the basic region is not divided. In this case, only the representative color value (X1, Y1) (0, 0) is registered in the basic region information (X1, Y1) as the representative color value. The representative color value (X1, Y1) (0, 0) in this case is the representative color value of the basic region (X1, Y2). On the other hand, when the number of child division is greater than or equal to 2, the basic region is divided. In this case, the representative color value (X1, Y1) (Y2, Y2) is the representative color value of the child region (X1, Y1) (Y2, Y2).

FIG. 5D is a diagram showing an example of content registered in the posted image DB 12c according to the embodiment. In the posted image DB 12c, posted images and information related to the posted images are registered. Specifically, in the posted image DB 12c, a mosaic image ID, the number of posted images, and posted image information are registered. The mosaic image ID is identification information of a mosaic image generated by using the registered posted images as materials. The number of posted images is the number of posted images acquired so far from the user terminal 2. The number of pieces of posted image information to be registered is equal to the number of posted images.

FIG. 5E is a diagram showing an example of content included in the posted image information. As shown in FIG. 5E, in the posted image information, an image number, a user ID, posted image data, and a representative color value are included in association with each other. The image number is a number given to the posted image. An image number is given to each posted image in posting order (in an order in which the mosaic image providing server 1 acquires the posted images). The user ID included in the posted image information is a user ID of a user who posted the posted image. In other words, the user ID included in the posted image information is a user ID of a user who uses the user terminal 2 from which the posted image is acquired. The posted image data is image data of the posted image. The representative color value is a value indicating a representative color of the posted image. Content of the representative color value of the posted image is the same as the content of the representative color value of a divided region.

FIG. 5F is a diagram showing an example of content registered in the mosaic image DB12d according to the embodiment. In the mosaic image DB 12d, information related to the mosaic image is registered. Specifically, in the mosaic image DB 12d, a mosaic image ID, an original image ID, a plurality of pieces of assigned image information, and mosaic image display data are registered in association with each mosaic image. The mosaic image ID is identification information of the mosaic image. The original image ID is an original image ID of an image of a picture of the mosaic image. The assigned image information is information indicating a posted image assigned to a divided region. The number of pieces of assigned image information to be registered is equal to the number of basic division of the original image. Each assigned image information is registered in association with an index of a corresponding basic region.

FIG. 5G is a diagram showing an example of content included in the assigned image information. As shown in FIG. 5G, in the assigned image information, one or more assigned image numbers are included in the assigned image information. The assigned image number is an image number of a posted image assigned to a divided region. The assignment image number of a divided region to which a posted image has not yet been assigned (hereinafter referred to as an "unassigned region") is set to an invalid number such as, for example, −1.

The number of the assigned image numbers to be registered is equal to the number of child division of a corresponding basic region. Specifically, in the assigned image information (X1, Y1), the assigned image numbers, the number of which is equal to the number of child division included in the child division number information of the basic region information (X1, Y1) registered in the original image DB 12b in association with the original image ID, are registered. Each assigned image number is registered in association with indexes of corresponding basic region and child region.

When the corresponding number of child division is 1, the basic region is not divided. In this case, only the assigned image number (X1, Y1) (0, 0) is registered in the assigned image information (X1, Y1) as the assigned image number. The assigned image number (X1, Y1) (0, 0) in this case is the image number of the posted image assigned to the basic region (X1, Y1). On the other hand, when the number of child division is greater than or equal to 2, the basic region is divided. In this case, the assigned image number (X1, Y1) (Y2, Y2) is the image number of the posted image assigned to the child region (X1, Y1) (Y2, Y2).

The mosaic image display data is data for displaying the mosaic image in a Web page. In other words, the mosaic image display data represents display content of the mosaic image. In the embodiment, the mosaic image is represented as a table in which a posted image is inserted in each cell. For example, the mosaic image display data is data described in a markup language such as HTML (Hyper Text Markup Language), XML (Extensible Markup Language), and XHTML (Extensible Hyper Text Markup Language). The mosaic image display data forms a part of an HTML document of a Web page in which the mosaic image is displayed. The system control unit 14 transmits the HTML document including the mosaic image display data to the user terminal 2, so that the system control unit 14 causes the mosaic image to displayed by the user terminal 2 on the basis of the HTML document. Specifically, the user terminal 2 displays a posted image in each cell of the table according to the description content of the mosaic image display data included in the HTML document, so that the user terminal 2 displays the mosaic image in the Web page. In the embodiment, the user terminal 2 generates (forms) the mosaic image on a screen.

In the mosaic image display data, for example, the table is defined by a table tag, a tr gag, a td tag, and the like. An img tag of, for example, <imgsrc="href="http://www.yyy.zzz/9876543210-0123.jpeg"> is inserted between a td start tag and a td end tag which represent a cell. Here, "http://www.yyy.zzz/9876543210-0123.jpeg" is an URL (Uniform Resource Locator) of the posted image data. "9876543210" is the original image ID. "0123" is the image number of the posted image. In this way, in a cell corresponding to a divided region to which a posted image is assigned, an img tag including the URL of the assigned posted image is inserted. The URL may be a URL of image data of a thumbnail of the posted image. In the mosaic image, normally, a posted image is displayed in a size smaller than the original display size. Therefore, image data of a thumbnail obtained by reducing the numbers of vertical and horizontal pixels of the posted image and reducing the display size may be transmitted to the user terminal 2 which displays the mosaic image. In this case, for example, when the system control unit 14 registers posted image data in the posted image DB 12c, the system control unit 14 generates image data of a thumbnail of the posted image on the basis of the posted image data and registers the image data of the thumbnail in the posted image DB 12c.

Content of the assigned image information registered in the mosaic image DB 12d is reflected on the mosaic image display data. Therefore, in the mosaic image DB 12d, only either one of the assigned image information and the mosaic image display data may be registered. If only the assigned image information is registered, when the system control unit 14 transmits a Web page in which the mosaic image is displayed, the system control unit 14 may generate the mosaic image display data on the basis of the assigned image information.

Next, other information stored in the storage unit 12 will be described. A division pattern table is stored in the storage unit 12. FIG. 7A is a diagram showing an example of content included in the division pattern table. The division pattern table is table information indicating a correspondence relationship between the edge degree of the basic region and the number of child division. As shown in FIG. 7A, in the division pattern table, the number of division patterns and one or more pieces of division pattern information are included.

The number of division patterns indicates the number of patterns of the number of child divisions. In the example shown in FIG. 2B, the number of division patterns is three. The number of pieces of division pattern information to be set is equal to the number of division patterns. FIG. 7B is a diagram showing an example of content included in the division pattern information. As shown in FIG. 7B, in the division pattern information, child division number information and a minimum edge degree are included. Content of the child division number information included in the division pattern information is the same as the content of the child division number information registered in the original image DB 12*b*. The minimum edge degree is the minimum value of the edge degree required to divide the basic region by the number of child division included in the child division number information. When an index of the division pattern information is N (N is an integer greater than or equal to 1), each division pattern information is set so that the following expressions are satisfied:

The number of child division of the division pattern information 1 >1

The number of child division of the division pattern information $N$+1>the number of child division of the division pattern information $N$ The edge degree of the division pattern information 1>the minimum value of the edge degree obtained by calculation (for example, 0 or the like).

The edge degree of the division pattern information $N$+1>the edge degree of the division pattern information $N$ In the examples in FIGS. 2B and 6, the number of child division, the number of child horizontal division, the number of child vertical division, and the minimum edge degree (an example of values set in advance in the present invention) of the division pattern information 1 are, for example, 4, 2, 2, and 3. Those of the division pattern information 2 are, for example, 9, 3, 3, and 7. Those of the division pattern information 3 are, for example, 16, 4, 4, and 20. Content of a piece of the child division number information when the basic region is divided among the pieces of the child division number information registered in the original image DB 12*b* corresponds to content of a piece of the child division number information included in one of pieces of the division pattern information.

The number of division patterns and each division pattern information are performed by, for example, an administrator of the mosaic image providing server 1 or the like. The number of division patterns may be greater than or equal to 1. The number of child horizontal division and the number of child vertical division need not be the same. The child division number information and the minimum edge degree can be arbitrarily set as long as the condition of the above expressions is satisfied. For example, when the number of division patterns is 1, all basic regions in which the edge degree is greater than or equal to the minimum edge degree included in the division pattern information 1 are divided into the same number of child regions. When the number of division patterns is 2 or more, the higher the edge degree of the basic region, the greater the number of child regions the basic region is divided into.

Also, The storage unit 12 stores various data such as an HTML documents for displaying a Web pages, an XML documents, image data, text data, and an electronic documents. Also, the storage unit 12 stores various setting values set by an administrator and the like. The setting values include a threshold value to determine whether or not the color of posted image is similar to the color of divided region.

Also, the storage unit 12 stores various programs such as an operating system, a WWW (World Wide Web) server program, a DBMS (DataBase Management System), and a mosaic image providing program. The mosaic image providing program is a program for performing processes related to the mosaic image such as registering the original image, acquiring a posted image, generating the mosaic image display data. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14*a*, a ROM (Read Only Memory) 14*b*, a RAM (Random Access Memory) 14*c*, and the like. In the system control unit 14, the CPU 14*a* reads and executes various programs, so that the system control unit 14 functions as a specifying means, a dividing means, an acquisition means, a determination means, and a presentation means of the present invention.

The mosaic image providing server 1 may include a plurality of server devices. For example, a server device that performs processes related to registering the original image, acquiring a posted image, and generating the mosaic image display data, a server device that transmits a Web page in response to a request from the user terminal 2, a server device that manages databases, and the like may be connected to each other by a LAN or the like.

3. Operation of Mosaic Image Providing System

Next, an operation of the mosaic image providing system S will be described with reference to FIGS. 8 to 11.

Figure 8:
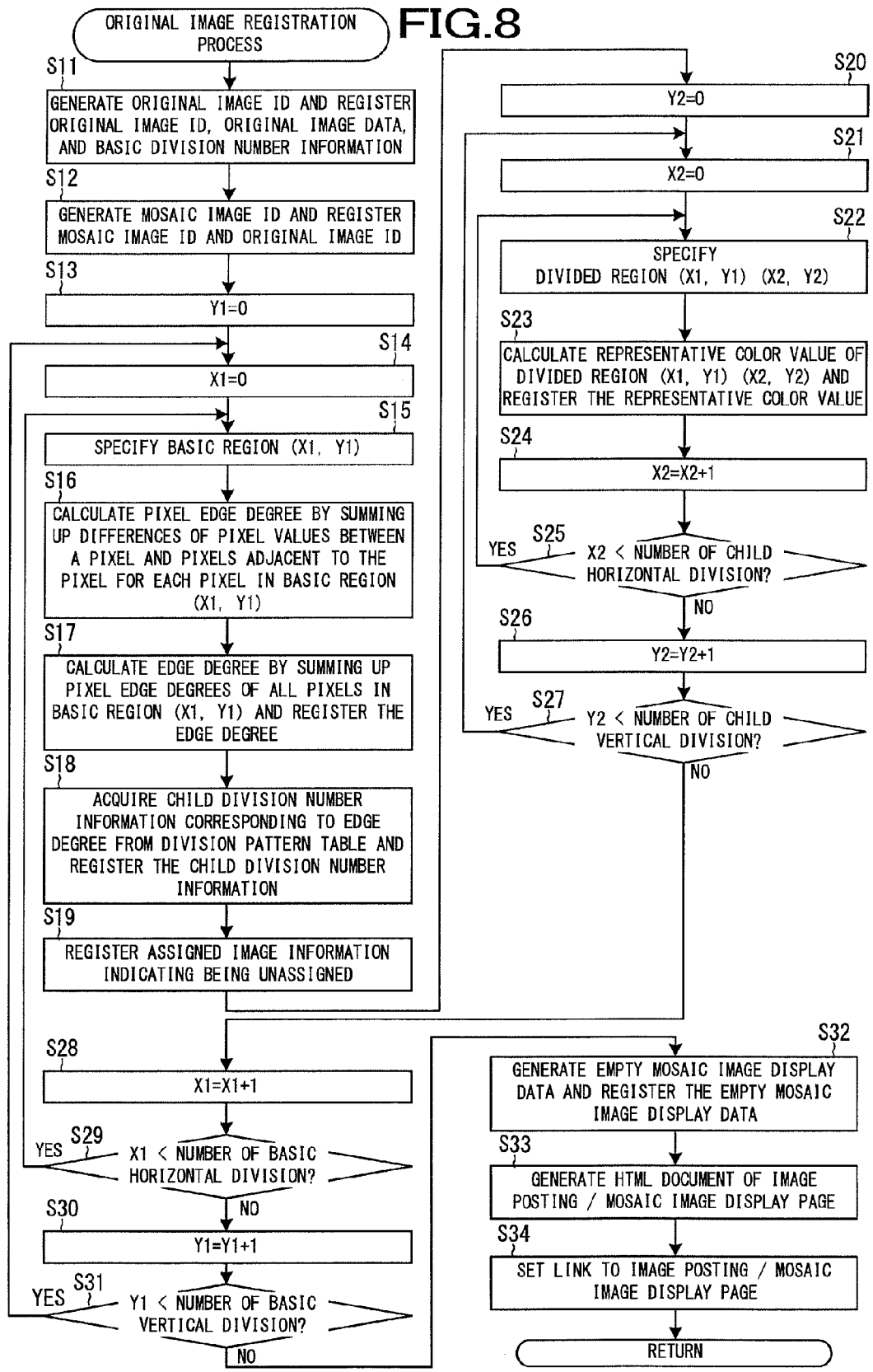
FIG. 8 is a flowchart showing a process example of an original image registration process of a system control unit 14 of the mosaic image providing server 1 according to the embodiment.

FIG. 8 is a flowchart showing a process example of an original image registration process of the system control unit 14 of the mosaic image providing server 1 according to the embodiment.

For example, an administrator of the mosaic image providing server 1 registers the original image by operating a management terminal device connected to the mosaic image providing server 1. Specifically, the administrator selects the original image and inputs the number of horizontal basic division and the number of basic vertical division. Then, the management terminal device transmits an original image registration request including the original image, the number of basic horizontal division, and the number of basic vertical division to the mosaic image providing server 1. For example, also a user may post the original image. In this case, the user terminal 2 of the user who posts the original image transmits the original image registration request.

The original image registration process is started when the mosaic image providing server 1 receives the original image registration request. The original image registration process is previously performed before a posted image reception process described later. After the original image registration process is performed, assignment of a posted image and the like in the posted image reception process can be performed.

In the original image registration process, the system control unit 14 generates a new original image ID. Next, the system control unit 14 generates the basic division number information based on the number of basic horizontal division and the number of basic vertical division included in the received original image registration request. Then, the system control unit 14 registers the new original image ID, the original image data included in the original image registration request, and the generated basic division number information into the original image DB 12b in association with each other (step S11). The system control unit 14 puts a bitmap image of the original image in the RAM 14c on the basis of the original image data.

Next, the system control unit 14 generates a new mosaic image ID. Next, the system control unit 14 registers the new mosaic image ID and the original image ID into the mosaic image DB 12d in association with each other (step S12). The system control unit 14 puts a bitmap image of the original image in the RAM 14c on the basis of the original image data.

Next, the system control unit 14 divides the original image into a plurality of basic regions. First, the system control unit 14 sets the index Y1 of the basic region to 0 (step S13). Next, the system control unit 14 sets the index X1 of the basic region to 0 (step S14). Next, the system control unit 14 specifies the basic region (X1, Y1) (step S15). Specifically, the system control unit 14 acquires the numbers of vertical and horizontal pixels of the original image from the registered original image data. Next, the system control unit 14 calculates a coordinate range of the pixels included in the basic region (X1, Y1) on the basis of the numbers of vertical and horizontal pixels of the original image and the number of basic horizontal division and the number of basic vertical division indicated by the registered basic division number information and the indexes X1 and Y1.

Next, the system control unit 14 calculates the pixel edge degree of each pixel included in the divided region (X1, Y1) (step S16). Specifically, the system control unit 14 acquires the value of each pixel included in the divided region (X1, Y1) from the bitmap image of the original image which is put in the RAM 14c. Then, the system control unit 14 calculates the pixel edge degrees by, for example, the calculation method indicated by the formula 1.

Next, the system control unit 14 calculates the edge degree of the divided region (X1, Y1) on the basis of the calculated each pixel edge degree. For example, the system control unit 14 calculates the edge degree by the calculation method indicated by the formula 2. Then, the system control unit 14 registers the calculated edge degree into the original image DB 12b in association with the new original image ID and the indexes X1 and Y1 (step S17).

Next, on the basis of the calculated edge degree and the division pattern table, the system control unit 14 registers the child division number information of the basic region (X1, Y1) into the original image DB 12b in association with the new original image ID and the indexes X1 and Y1 (step S18). Specifically, the system control unit 14 compares the minimum edge degree included in the division pattern information with the calculated edge degree in ascending order of the index value in the division pattern information. Here, when the calculated edge degree is smaller than the minimum edge degree included in the division pattern information 1, the system control unit 14 registers the child division number information in which all of the number of child division, the number of child horizontal division, and the number of child vertical division are 1. On the other hand, when the calculated edge degree is greater than or equal to the minimum edge degree included in the division pattern information M (M is an integer greater than or equal to 2) and smaller than the minimum edge degree included in the division pattern information M+1, the system control unit 14 registers the child division number information included in the division pattern information M. When the calculated edge degree is greater than or equal to the minimum edge degree included in the division pattern information of the maximum index value, the system control unit 14 registers the child division number information included in the division pattern information of the maximum index value. In this way, as the specifying means, the system control unit 14 specifies the basic region including an edge.

Next, the system control unit 14 registers the assigned image information (X1, Y1) into the mosaic image DB 12d in association with the new mosaic image ID and the indexes X1 and Y1 (step S19). At this time, the system control unit 14 sets the number of the assigned image numbers included in the assigned image information (X1, Y1) to be equal to the number of child division included in the registered child division number information. The system control unit 14 sets each assigned image number to an invalid number indicating an unassigned region.

Next, the system control unit 14 sets the index Y2 of the child region to 0 (step S20). Next, the system control unit 14 sets the index X2 of the child region to 0 (step S21). Next, the system control unit 14 specifies the divided region (X1, Y1) (X2, Y2) (step S22). Specifically, the system control unit 14 calculates a coordinate range of pixels included in the divided region (X1, Y1) (X2, Y2) on the basis of the numbers of vertical and horizontal pixels of the original image, the number of basic horizontal division and the number of basic vertical division included in the registered basic division number information, the number of child horizontal division and the number of child vertical division included in the registered child division number information, and the indexes X1, Y1, X2, and Y2. When the number of child division is 1, the divided region (X1, Y1) (X2 (X2=0), Y2 (Y2=0)) is a basic region and when the number of child division is greater than or equal to 2, the divided region (X1, Y1) (X2, Y2) is a child region.

Next, the system control unit 14 calculates the representative color value of the divided region (X1, Y1) (X2, Y2) (step S23). For example, the system control unit 14 acquires values of the pixels included in the divided region (X1, Y1) (X2, Y2) from a bitmap image of the original image which is put in the RAM 14c. Next, the system control unit 14 sums up the acquired pixel values for each basic color R, G, and B. Next, the system control unit 14 divides the sum of the pixel values by a total number of pixels included in the divided region (X1, Y1) (X2, Y2) for each basic color. The averages of the pixel values obtained by the above calculation for each basic color are the representative color value. Next, the system control unit 14 registers the calculated representative color value into the original image DB 12b in association with a new original image ID, and the indexes X1, Y1, X2, and Y2.

Next, the system control unit 14 adds 1 to the index X2 (step S24). Next, the system control unit 14 determines whether or not the index X2 is smaller than the number of child horizontal division (step S25). At this time, if the system control unit 14 determines that the index X2 is smaller than the number of child horizontal division (step S25: YES), the system control unit 14 proceeds to step S22. On the other hand, if the system control unit 14 determines that the index X2 is not smaller than the number of child horizontal division (step S25: NO), the system control unit 14 adds 1 to the index Y2 (step S26). Next, the system control unit 14 determines whether or not the index Y2 is smaller than the number of child vertical division (step S27). At this time, if the system control unit 14 determines that the index Y2 is smaller than the number of child vertical division (step S27: YES), the system control unit 14 proceeds to step S21. The system control unit 14 repeats the processes from step S21 to step S27, so that the system control unit 14 registers the representative color value of the basic region (X1, Y1) or the representative color value of each child region included in the basic region (X1, Y1). In this way, when the edge degree of the basic region is greater than or equal to the minimum edge degree included in the division pattern information 1, as the dividing means, the system control unit 14 divides the basic region into a plurality of child regions.

When the system control unit 14 determines that the index Y2 is not smaller than the number of child vertical division (step S27: NO), the system control unit 14 adds 1 to the index X1 (step S28). Next, the system control unit 14 determines whether or not the index X1 is smaller than the number of basic horizontal division (step S29). At this time, if the system control unit 14 determines that the index X1 is smaller than the number of basic horizontal division (step S29: YES), the system control unit 14 proceeds to step S15. On the other hand, if the system control unit 14 determines that the index X1 is not smaller than the number of basic horizontal division (step S29: NO), the system control unit 14 adds 1 to the index Y1 (step S30). Next, the system control unit 14 determines whether or not the index Y1 is smaller than the number of basic vertical division (step S31). At this time, if the system control unit 14 determines that the index Y1 is smaller than the number of basic vertical division (step S31: YES), the system control unit 14 proceeds to step S14. The system control unit 14 repeats the processes from step S14 to step S31, so that the system control unit 14 registers the representative color values of all the divided regions.

When the system control unit 14 determines that the index Y1 is not smaller than the number of basic vertical division (step S31: NO), the system control unit 14 generates empty mosaic image display data and registers the generated mosaic image display data into the mosaic image DB 12d in association with the new mosaic image ID (step S32). The empty mosaic image display data is mosaic image display data in which an img tag including the URL of the posted image data is not included at all. Here, the system control unit 14 generates the mosaic image display data so that a cell corresponding to a basic region divided into child regions among cells included in a table to be defined in the empty mosaic image display data is further divided into a plurality of cells according to the number of child horizontal division and the number of child vertical division.

Next, the system control unit 14 generates an HTML document of an image posting/mosaic image display page 400 (step S33). The image posting/mosaic image display page 400 is a Web page from which an image is posted and on which a mosaic image is displayed. The system control unit 14 causes the storage unit 12 to store the generated HTML document. Next, the system control unit 14 sets a hyper link to the generated HTML document (step S34). For example, the system control unit 14 adds the a tag including the URL of the HTML document of the image posting/mosaic image display page 400 to the HTML document of the top page of the Web site of the mosaic image providing system S. Thereby, an image can be posted by a user and the mosaic image can be browsed by the user. When the system control unit 14 completes the process of step S34, the system control unit 14 ends the original image registration process.

Figure 9:
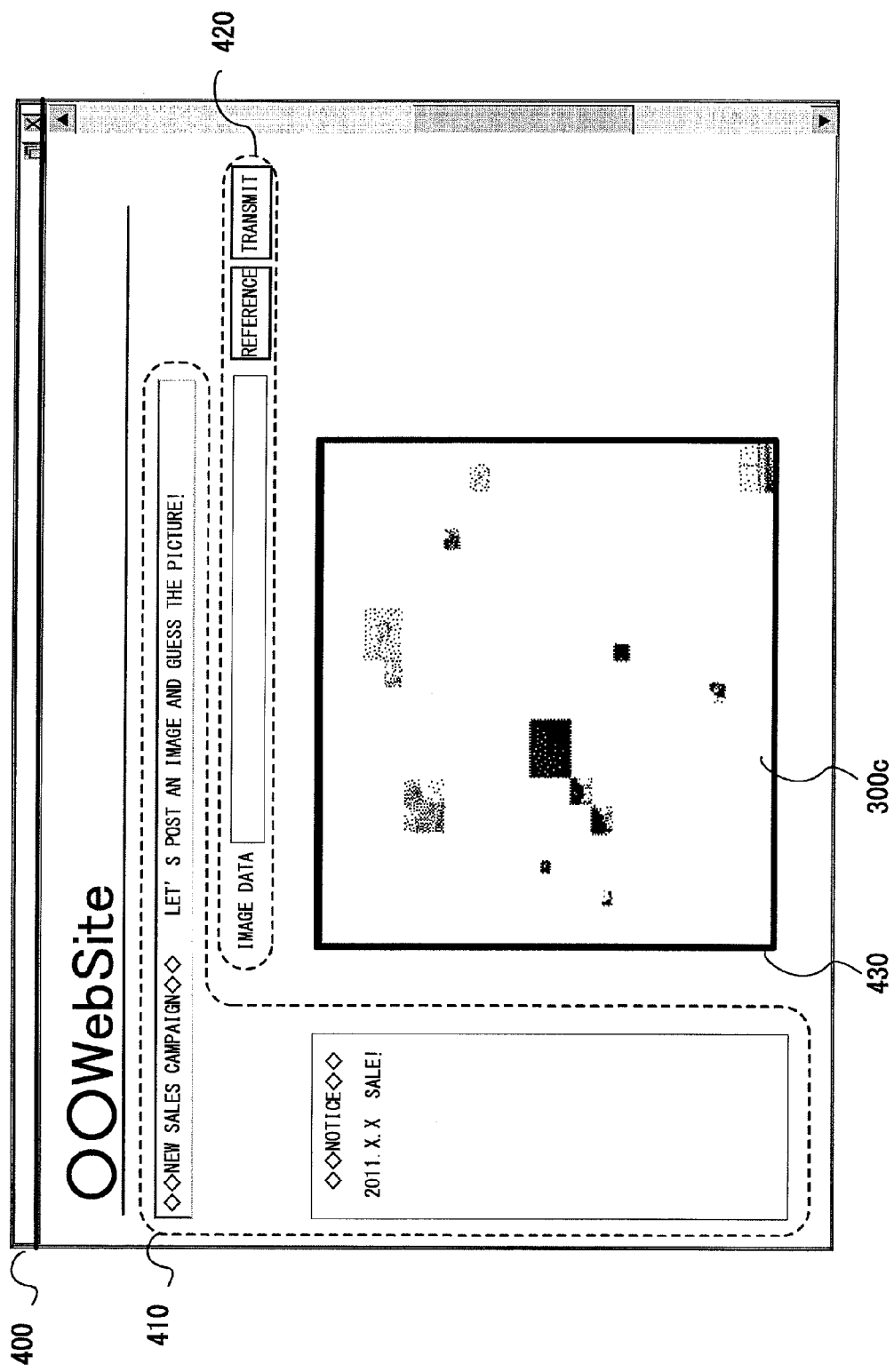
FIG. 9 is a diagram showing a screen display example of an image posting/mosaic image display page 400 according to the embodiment.

FIG. 9 is a diagram showing a screen display example of the image posting/mosaic image display page 400 according to the embodiment. As shown in FIG. 9, the image posting/mosaic image display page 400 includes a message portion 410, a posted image transmission portion 420, a mosaic image display portion 430, and the like. In the message portion 410, for example, information such as a notice related to an item for sale, a service, and the like in a site related to the mosaic image providing system S is displayed. In the posted image transmission portion 420, various widgets (operation element) for posting an image are displayed. For example, an input field for specifying a path name of the posted image data, a reference button for displaying a dialog for selecting posted image data from the image data stored in the user terminal 2, a transmission button for transmitting the posted image data, and the like are displayed. In the mosaic image display portion 430, a mosaic image generated by images posted so far is displayed. In FIG. 9, a mosaic image 300c is displayed as an example of the mosaic image. The mosaic image 300c is a mosaic image generated by assigning posted images to a part of the divided regions shown in FIG. 2B. If no image is posted after the original image registration process is completed, no mosaic image is displayed in the mosaic image display unit 430.

When any one of the posted images included in the mosaic image displayed in the mosaic image display portion 430 is selected by a user, for example, the selected posted image may be enlarged and displayed in the image posting/mosaic image display page 400 or information related to a user who posted the selected posted image (for example, a nickname and a profile of the user) may be displayed in the image posting/mosaic image display page 400. When displaying the information related to a user who posted the selected posted image, for example, the system control unit 14 inserts the user ID of the user who posted the selected posted image into the mosaic image display data when inserting the img tag into the mosaic image display data. When a user selects any one of the posted images in the mosaic image display portion 430, the user terminal 2 transmits a request including the user ID of the user who posted the selected posted image. The request is transmitted to the mosaic image providing server 1. The system control unit 14 acquires necessary information from user information corresponding to the user ID included in the received request and transmits the information to the user terminal 2. Then, the user terminal 2 displays the received information.

Figure 10:
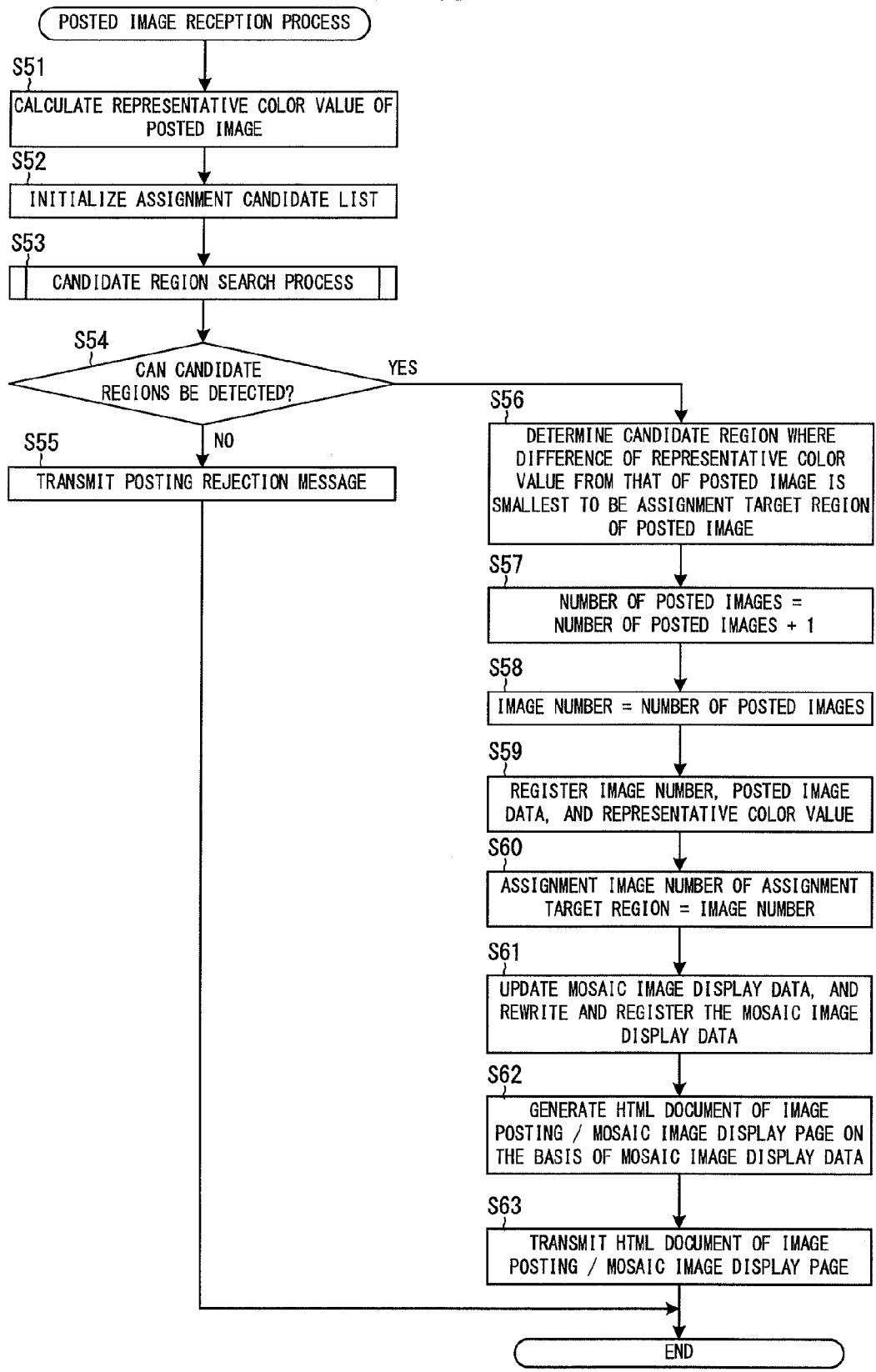
FIG. 10 is a flowchart showing a process example of a posted image reception process of the system control unit 14 of the mosaic image providing server 1 according to the embodiment.

FIG. 10 is a flowchart showing a process example of the posted image reception process of the system control unit 14 of the mosaic image providing server 1 according to the embodiment. When a user specifies posted image data and selects the transmission button in the posted image transmission portion 420 in the image posting/mosaic image display page 400, the user terminal 2 transmits a posting request to the mosaic image providing server 1. The posting request includes the specified posted image data, the user ID of the user who performed the operation, and the mosaic image ID of the mosaic image to be generated. The posted image reception process is started when the mosaic image providing server 1, as the acquisition means, receives the posting request.

As the determination means, the system control unit 14 determines a divided region to which a posted image is assigned by the processes of steps S51 to S56. First, the system control unit 14 calculates the representative color value of the posted image (hereinafter referred to as a "posted image to be processed") indicated by the posted image data included in the posting request (step S51). This calculation method is the same as that in step S23 in the original image registration process.

Here, the system control unit 14 performs exclusive control using, for example, mutex or the like, and when acquiring a right to perform a process of step S52 and the following processes (critical session), the system control unit 14 performs a lock operation. Thereby, the system control unit 14 prevents a plurality of processes from performing a critical session at the same time.

Next, the system control unit 14 initializes an assignment candidate list and stores the assignment candidate list in the RAM 14c (step S52). The assignment candidate list is a list of divided regions (hereinafter referred to as "candidate regions") that satisfy the conditions where the posted image to be processed can be assigned. The candidate region is a divided region where the difference of the representative color value from that of the posted image to be processed is smaller than or equal to a threshold value. In the assignment candidate list, indexes X1, Y1, X2, and Y2 of a candidate region and a value of the difference of the representative color value between the candidate region and the posted image to be processed are registered in association with each other.

Next, the system control unit 14 performs a candidate region search process described later (step S53). In the candidate region search process, candidate regions are searched for from unassigned regions and detected candidate regions are registered in the assignment candidate list.

Next, the system control unit 14 determines whether or not candidate regions can be detected (step S54). Specifically, the system control unit 14 determines whether or not one or more sets of the index and the value of the difference of a candidate region are registered in the assignment candidate list. At this time, if the index and the value of the difference of a candidate region are not registered in the assignment candidate list, the system control unit 14 determines that no candidate region can be detected (step S54: NO). In this case, the system control unit 14 transmits a posting rejection message to the user terminal 2 that is the transmission source of the posting request (step S55). The posting rejection message is a message indicating that the posting of the image is rejected. The user terminal 2 displays the received posting rejection message on a screen. When the system control unit 14 completes the process of step S55, the system control unit 14 ends the posted image reception process.

On the other hand, if one or more sets of the index and the value of the difference of a candidate region are registered in the assignment candidate list, the system control unit 14 determines that candidate region can be detected (step S54: YES). In this case, the system control unit 14 determines a candidate region where the difference of the representative color value from that of the posted image to be processed is the smallest among the detected candidate regions to be a divided region (hereinafter referred to as an "assignment target region") to which the posted image to be processed is assigned (step S56). Specifically, the system control unit 14 searches for the smallest value from the values of the differences registered in the assignment candidate list. Then, the system control unit 14 acquires the indexes X1, X2, Y1, and Y2 associated with the smallest value of the difference from the assignment candidate list as the indexes of the assignment target region.

Next, the system control unit 14 updates the number of posted images by adding 1 to the number of posted images registered in the posted image DB 12c in association with the mosaic image ID (hereinafter referred to as a "target mosaic image ID") included in the posting request (step S57). Next, the system control unit 14 sets the image number of the posted image to be processed to the updated number of posted images (step S58). Next, the system control unit 14 registers the image number, the user ID and the posted image data included in the posting request, and the posted image information including the representative color value of the posted image to be processed into the posted image DB 12c in association with the target mosaic image ID (step S59).

Next, the system control unit 14 rewrites the assignment image number of the assignment target region registered in the mosaic image DB 12d in association with the target mosaic image ID to the image number of the posted image to be processed (step S60).

Next, the system control unit 14 updates the mosaic image display data registered in the mosaic image DB 12d in association with the target mosaic image ID (step S61). Specifically, in the mosaic image display data, the system control unit 14 inserts an img tag including the URL of the posted image data of the posted image to be processed into a cell corresponding to the index of the assignment target region.

Next, the system control unit 14 generates an HTML document of the image posting/mosaic image display page 400 including the updated mosaic image display data and stores the HTML document into the storage unit 12 (step S62). Next, the system control unit 14 transmits the generated HTML document to the user terminal 2 that is the transmission source of the posting request (step S63). Here, the system control unit 14 performs an unlock operation to allow other processes to perform the critical session. When the system control unit 14 completes the process of step S63, the system control unit 14 ends the posted image reception process.

The user terminal 2 displays the image posting/mosaic image display page 400 on a screen on the basis of the received HTML document. At this time, the system control unit 14 transmits a request including the URL of the posted image data to the mosaic image providing server 1 on the basis of the img tag included in the mosaic image display data. The system control unit 14 acquires the mosaic image ID and the image number from the URL included in the received request. Next, the system control unit 14 acquires the posted image data corresponding to the acquired mosaic image ID and the image number from the posted image DB 12c. Next, the system control unit 14 transmits the acquired posted image data to the user terminal 2. The user terminal 2 displays the posted image in the mosaic image display portion 430 in the image posting/mosaic image display page 400 on the basis of the acquired posted image data. Thereby, for example, the mosaic image as shown in FIG. 9 is displayed. In this way, the system control unit 14 transmits the mosaic image display data, so that, as the presentation means, the system control unit 14 causes the mosaic image to be presented to the user by the user terminal 2.

Figure 11:
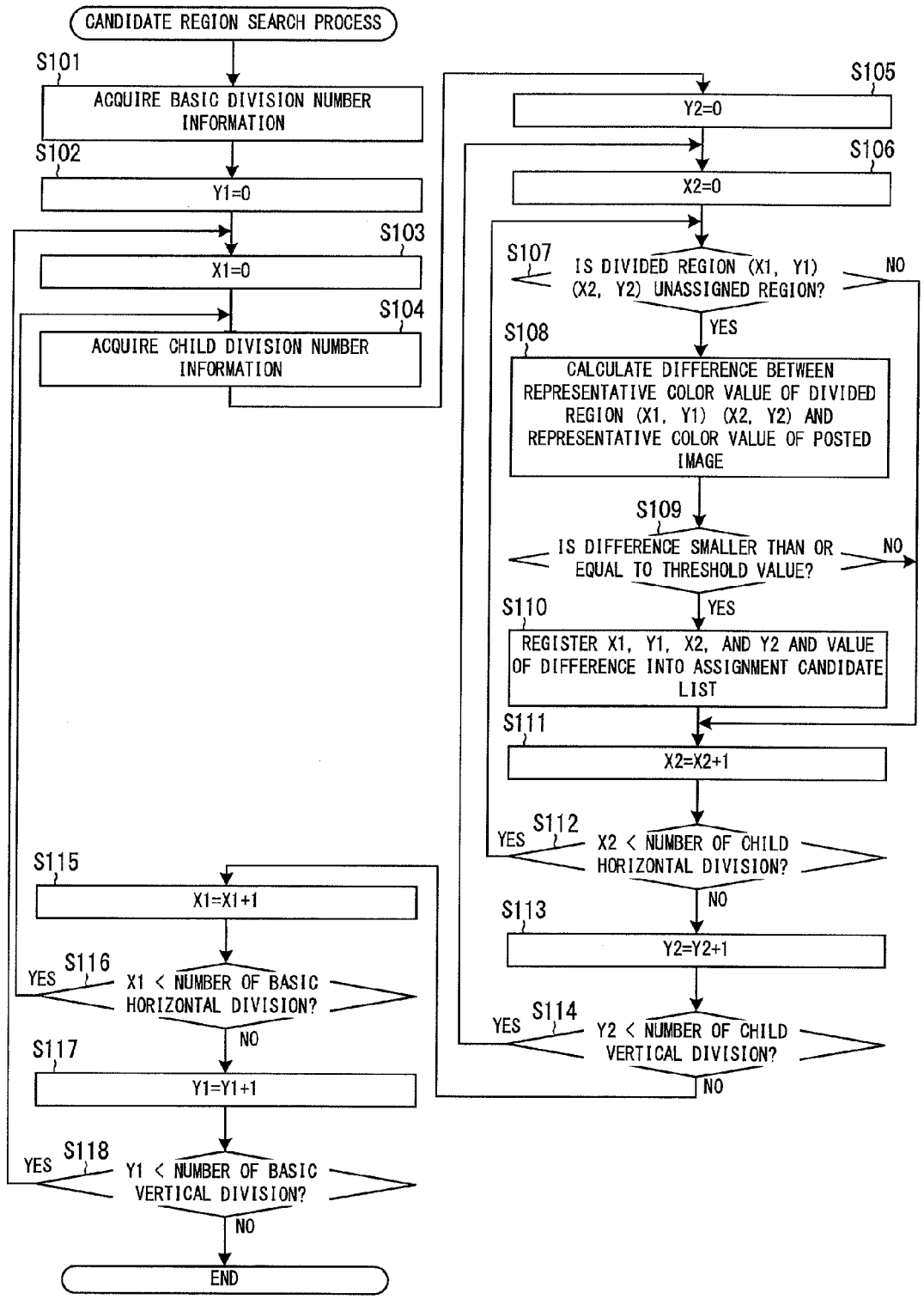
FIG. 11 is a flowchart showing a process example of a candidate region search process of the system control unit 14 of the mosaic image providing server 1 according to the embodiment.

FIG. 11 is a flowchart showing a process example of the candidate region search process of the system control unit 14 of the mosaic image providing server 1 according to the embodiment.

First, the system control unit 14 acquires an original image ID (hereinafter referred to as a "target original image ID") corresponding to the target mosaic image ID from the mosaic image DB 12d. Next, the system control unit 14 acquires the basic division number information corresponding to the target original image ID from the original image DB 12b (step S101).

Next, the system control unit 14 sets the index Y1 of the basic region to 0 (step S102). Next, the system control unit 14 sets the index X1 of the basic region to 0 (step S103). Next, the system control unit 14 acquires the child division number information from the basic region information (X1, Y1) registered in the original image DB 12b in association with the target original image ID (step S104). Next, the system control unit 14 sets the index Y2 of the child region to 0 (step S105). Next, the system control unit 14 sets the index X2 of the child region to 0 (step S106).

Next, the system control unit 14 determines whether or not the divided region (X1, Y1) (X2, Y2) is an unassigned region (step S107). Specifically, the system control unit 14 determines whether or not the assigned image number (X1, Y1) (X2, Y2) registered in the mosaic image DB 12d in association with the target mosaic image ID is a number that indicates an unassigned region.

At this time, if the assigned image number (X1, Y1) (X2, Y2) is a number that indicates an unassigned region, the system control unit 14 determines that the divided region (X1, Y1) (X2, Y2) is an unassigned region (step S107: YES). In this case, the system control unit 14 calculates a difference between the representative color value of the divided region (X1, Y1) (X2, Y2) and the representative color value of the posted image to be processed (step S108). Specifically, the system control unit 14 acquires the representative color value (X1, Y1) (X2, Y2) registered in the original image DB 12b in association with the target original image ID. Next, the system control unit 14 calculates the difference by the following formula 3.

$$\text{Diff}=(R_1-R_2)^2+(G_1-G_2)^2+(B_1-B_2)^2 \quad \text{[Formula 3]}$$

In the formula 3, Diff is the difference. R1, G1, and B1 are representative color values of R, G, and B in the divided region (X1, Y1) (X2, Y2). R2, G2, and B2 are representative color values of R, G, and B in the posted image to be processed. The system control unit 14 may calculate absolute values of the differences calculated for each basic color and sum up the absolute values instead of calculating squares of the differences calculated for each basic color and summing up the calculation results.

Next, the system control unit 14 determines whether or not the calculated value of the difference is smaller than or equal to the threshold value (step S109). At this time, if the system control unit 14 determines that the value of the difference is smaller than or equal to the threshold value (step S109: YES), the system control unit 14 determines the divided region (X1, Y1) (X2, Y2) to be a candidate region (step S110). Specifically, the system control unit 14 registers the indexes X1, Y1, X2, and Y2 and the calculated value of the difference into the assignment candidate list in association with each other. Then, the system control unit 14 proceeds to step S111.

In step S107, if the assigned image number (X1, Y1) (X2, Y2) is not a number that indicates an unassigned region, the system control unit 14 determines that the divided region (X1, Y1) (X2, Y2) is not an unassigned region (step S107: NO). In this case, the system control unit 14 proceeds to step S111. In step S109, if the system control unit 14 determines that the value of the difference is not smaller than or equal to the threshold value (step S109: NO), the system control unit 14 proceeds to step S111.

In step S111, the system control unit 14 adds 1 to the index X2. Next, the system control unit 14 determines whether or not the index X2 is smaller than the number of child horizontal division included in the acquired child division number information (step S112). At this time, if the system control unit 14 determines that the index X2 is smaller than the number of child horizontal division (step S112: YES), the system control unit 14 proceeds to step S107. On the other hand, if the system control unit 14 determines that the index X2 is not smaller than the number of child horizontal division (step S112: NO), the system control unit 14 adds 1 to the index Y2 (step S113). Next, the system control unit 14 determines whether or not the index Y2 is smaller than the number of child vertical division included in the acquired child division number information (step S114). At this time, if the system control unit 14 determines that the index Y2 is smaller than the number of child vertical division (step S114: YES), the system control unit 14 proceeds to step S106. The system control unit 14 repeats the processes from step S106 to step S114, so that the system control unit 14 searches for candidate regions from the basic region (X1, Y1) or each child region included in the basic region (X1, Y1).

When the system control unit 14 determines that the index Y2 is not smaller than the number of child vertical division (step S114: NO), the system control unit 14 adds 1 to the index X1 (step S115). Next, the system control unit 14 determines whether or not the index X1 is smaller than the number of basic horizontal division included in the acquired basic division number information (step S116). At this time, if the system control unit 14 determines that the index X1 is smaller than the number of basic horizontal division (step S116: YES), the system control unit 14 proceeds to step S104. On the other hand, if the system control unit 14 determines that the index X1 is not smaller than the number of basic horizontal division (step S116: NO), the system control unit 14 adds 1 to the index Y1 (step S117). Next, the system control unit 14 determines whether or not the index Y1 is smaller than the number of basic vertical division included in the acquired basic division number information (step S118). At this time, if the system control unit 14 determines that the index Y1 is smaller than the number of basic vertical division (step S118: YES), the system control unit 14 proceeds to step S103. The system control unit 14 repeats the processes from step S103 to step S118, so that the system control unit 14 searches for candidate regions from all the unassigned regions.

If the system control unit 14 determines that the index Y1 is not smaller than the number of basic vertical division (step S118: NO), the system control unit 14 ends the candidate region search process.

As described above, according to the embodiment, the system control unit 14 of the mosaic image providing server 1 specifies regions including an edge of an image from a plurality of basic regions, further divides the specified basic regions into a plurality of child regions, and acquires a posted image specified by a user, determines areas to which the acquired posted image will be assigned from the basic regions that are not divided into child regions and the child regions formed by the division. On the basis of the determined assignment, the system control unit 14 causes a mosaic image in which the acquired posted image is arranged to be presented to user.

Therefore, among a plurality of basic regions, the basic regions including an edge, which contribute to improve the recognizability of the picture of the original image, are divided into smaller child regions, so that it is possible to provide a mosaic image having high recognizability of the picture of the original image while suppressing the number of regions required to complete the mosaic image.

The system control unit 14 calculates the edge degree that indicates the degree of an edge included in an image of the basic region and specifies a region whose edge degree is greater than or equal to a predetermined threshold value to be the basic region including an edge.

Therefore, it is possible to determine a region that includes an edge by the predetermined value.

It is characterized that the system control unit 14 divides the specified basic regions so that the higher the calculated edge degree of the basic region, the greater the number of division of the basic region.

Therefore, the number of division of the basic regions including an edge varies depending on the degree of influence on the recognizability of the picture of the original image, so that it is possible to provide a mosaic image having higher recognizability of the picture of the original image while suppressing the number of division of the original image.

In step S108 of the candidate region search process in the embodiment described above, the mosaic image providing server 1 calculates the difference of the representative color value between the posted image and all the divided regions to which no posted image is assigned. However, it is possible to reduce the number of divided regions where the calculation is performed and reduce the calculation time by rearranging the divided regions in advance on the basis of the representative color values. For example, the system control unit 14 generates a list indicating the divided regions in ascending order of the representative color values of R, a list indicating the divided regions in ascending order of the representative color values of G, and a list indicating the divided regions in ascending order of the representative color values of B. When the system control unit 14 receives a posted image and calculates the representative value of the posted image, the system control unit 14 calculates the minimum value and the maximum value of the representative value where the difference from the representative value of the posted image is smaller than or equal to a threshold value for each of R, G, and B. The threshold value at this time may be different from the threshold value used to calculate the difference by the formula 3. Next, the system control unit 14 specifies a range of the divided regions where the difference of the representative value from that of the posted image is smaller than or equal to the threshold value by using the generated lists by, for example, a binary search method. The system control unit 14 performs the above process for each of R, G, and B. The system control unit 14 determines divided regions where the difference of the representative value from that of the posted image is smaller than or equal to the threshold value in all of R, G, and B to be the candidate regions.

In the embodiment described above, the mosaic image providing server 1 determines the candidate regions to which the posted image is assigned from the unassigned regions. However, the mosaic image providing server 1 may determine the candidate regions to which the posted image is assigned regardless of whether or not a posted image has already been assigned. For example, when a color of the posted image to be processed, which is tried to be assigned to a divided region, is more similar to the color of the divided region than the color of the posted image which has already been assigned to the divided region, the mosaic image providing server 1 may assign the posted image to be processed to the divided region and assign the posted image which has already been assigned to the divided region to an unassigned region.

In the embodiment described above, the mosaic image providing server 1 determines the divided region where the difference of the representative color value from that of the posted image is the smallest to be the assignment target region. However, for example, the mosaic image providing server 1 may determine any divided region among divided regions where the difference of the representative color value from that of the posted image is smaller than or equal to a threshold value to be the assignment target region.

In the embodiment described above, the mosaic image providing server 1 assigns one posted image to one divided region. However, for example, the mosaic image providing server 1 may assign one posted image to a plurality of regions. For example, the mosaic image providing server 1 may assign the same posted image to a plurality of regions among the divided regions where the difference of the representative color value from that of the posted image is smaller than or equal to a threshold value.

In the embodiment described above, the mosaic image providing server 1 determines the assignment target region on the basis of the representative color value of the posted image and the representative color values of the divided regions. However, for example, the mosaic image providing server 1 may determine the assignment target region on the basis of a pattern of the posted image and patterns included in the divided regions. For example, the mosaic image providing server 1 may calculate the degrees of similarity which indicate the similarity between the pattern of the posted image and the patterns included in the divided regions and determine the assignment target region from divided regions where the degree of similarity is greater than or equal to a predetermined threshold value. For example, the mosaic image providing server 1 may calculate the degrees of similarity of an image including the pattern and the color between the posted image and the divided regions and determine the assignment target region from divided regions where the degree of similarity is greater than or equal to a predetermined threshold value.

In the embodiment described above, the mosaic image providing server 1 transmits the HTML document including the mosaic image display data to the user terminal 2 to cause the mosaic image to be displayed by the user terminal 2 However, the mosaic image providing server 1 may transmit image data of the mosaic image to the user terminal 2 without change. In this case, for example, the mosaic image providing server 1 generates image data of the mosaic image in which each posted image is placed to a position of an assigned region on the basis of the posted image data which have been acquired so far and registered in the posted image DB 12c and the assignment image numbers registered in the mosaic image DB 12d.

In the embodiment described above, the mosaic image providing server 1 can use images posted from a plurality of users to generate display data of one mosaic image. However, for example, the mosaic image providing server 1 may generate display data of the mosaic image by using only images posted from one user.

In the embodiment described above, the mosaic image providing server 1 includes the specifying means, the dividing means, the acquisition means, the determination means, and the presentation means, and the mosaic image providing server 1 transmits display data to the user terminal 2, so that the mosaic image providing server 1 causes the user terminal 2 to display the mosaic image. However, for example, a device such as the user terminal 2 may include the specifying means, the dividing means, the acquisition means, the determination means, and the presentation means, and the device such as the user terminal 2 may calculate the edge degree, divide the basic region, assign the posted image, generate the mosaic image, and cause the mosaic image to be display by a display in stand-alone mode.

Reference Signs List

1 Mosaic image providing server
2 User terminal
11 Communication unit
12 Storage unit
12a Member information DB
12b Original image DB
12c Posted image DB
12d Mosaic image DB 13 Input/output interface
14 System control unit
14a CPU
14b ROM
14c RAM
15 System bus
NW Network
S Mosaic image providing system

The invention claimed is:

1. An image providing device for providing a mosaic image of an original image divided into a plurality of regions, the image providing device comprising:
   a specifying unit that calculates an edge degree indicating a degree of an edge included in an image of the region and specifies the region whose edge degree is greater than or equal to a predetermined value to be a region including an edge of an image from the plurality of regions;
   a dividing unit that further divides the specified region into a plurality of regions so that the higher the calculated edge degree of the region, the greater the number of division;
   an acquisition unit that acquires an image specified by a user;
   a determination unit that determines a region to which the acquired image is assigned from regions not divided by the dividing unit among the plurality of regions and from the regions formed by being divided by the dividing unit; and
   a presentation unit that, on the basis of assignment determined by the determination unit, causes a mosaic image in which the acquired image is arranged to be presented.

2. An image providing method in an image providing device for providing a mosaic image of an original image divided into a plurality of regions, the image providing method comprising:
   a specifying step of calculating an edge degree indicating a degree of an edge included in an image of the region and specifying the region whose edge degree is greater than or equal to a predetermined value to be a region including an edge of an image from the plurality of regions;
   a dividing step of further dividing the specified region into a plurality of regions so that the higher the calculated edge degree of the region, the greater the number of division;
   an acquisition step of acquiring an image specified by a user;
   a determination step of determining a region to which the acquired image is assigned from regions not divided in the dividing step among the plurality of regions and from the regions formed by being divided in the dividing step; and
   a presentation step of, on the basis of assignment determined in the determination step, causing a mosaic image in which the acquired image is arranged to be presented.

3. A non-transitory recording medium in which an image processing program is computer-readably recorded, the image processing program causing a computer, which is included in an image providing device for providing a mosaic image of an original image divided into a plurality of regions, to function as:
   a specifying unit that calculates an edge degree indicating a degree of an edge included in an image of the region and specifies the region whose edge degree is greater than or equal to a predetermined value to be a region including an edge of an image from the plurality of regions;
   a dividing unit that further divides the specified region into a plurality of regions so that the higher the calculated edge degree of the region, the greater the number of division;
   an acquisition unit that acquires an image specified by a user;
   a determination unit that determines a region to which the acquired image is assigned from regions not divided by the dividing unit among the plurality of regions and from the regions formed by being divided by the dividing unit; and
   a presentation unit that, on the basis of assignment determined by the determination unit, causes a mosaic image in which the acquired image is arranged to be presented.

* * * * *